(12) United States Patent
Logunov et al.

(10) Patent No.: US 9,093,003 B2
(45) Date of Patent: Jul. 28, 2015

(54) MANIPULATION OF COLOR ILLUMINATION USING LIGHT DIFFUSING FIBER

(71) Applicants: Stephan Lvovich Logunov, Corning, NY (US); Alranzo Boh Ruffin, Painted Post, NY (US)

(72) Inventors: Stephan Lvovich Logunov, Corning, NY (US); Alranzo Boh Ruffin, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 13/633,381

(22) Filed: Oct. 2, 2012

(65) Prior Publication Data

US 2014/0092623 A1    Apr. 3, 2014

Related U.S. Application Data

(60) Provisional application No. 61/545,720, filed on Oct. 11, 2011.

(51) Int. Cl.
| | |
|---|---|
| F21V 7/04 | (2006.01) |
| F21V 11/00 | (2006.01) |
| G02B 5/02 | (2006.01) |
| H01J 5/16 | (2006.01) |
| H01P 5/00 | (2006.01) |
| G09F 13/18 | (2006.01) |
| G09F 9/302 | (2006.01) |
| G09F 13/20 | (2006.01) |
| G09F 13/42 | (2006.01) |
| F21V 8/00 | (2006.01) |
| B82Y 20/00 | (2011.01) |

(52) U.S. Cl.
CPC ............. *G09F 13/18* (2013.01); *G02B 6/001* (2013.01); *G02B 6/0003* (2013.01); *G09F 9/302* (2013.01); *G09F 13/20* (2013.01); *G09F 13/42* (2013.01); *B82Y 20/00* (2013.01); *G09F 2013/1854* (2013.01); *G09F 2013/1886* (2013.01)

(58) Field of Classification Search
CPC ......... G09F 13/18; G09F 9/302; G09F 13/20; G09F 13/42; G09F 2013/1854; G09F 2013/1886; G02B 6/0003; G02B 6/001; B82Y 20/00
See application file for complete search history.

(56) References Cited

U.S. PATENT DOCUMENTS

| | | | |
|---|---|---|---|
| 5,675,678 | A | 10/1997 | Neuberger et al. |
| 2006/0002101 | A1 | 1/2006 | Wheatley et al. |
| 2008/0158905 | A1 | 7/2008 | Chuang et al. |
| 2010/0033988 | A1 | 2/2010 | Chiu et al. |
| 2011/0122646 | A1 | 5/2011 | Bickham et al. |
| 2011/0188261 | A1 | 8/2011 | Deng et al. |

FOREIGN PATENT DOCUMENTS

FR      2955539 A1    7/2011

*Primary Examiner* — Donald Raleigh
(74) *Attorney, Agent, or Firm* — Svetlana Short (57) ABSTRACT

An illuminated color display panel having at least one light diffusing waveguide, and a transparent panel having at least one luminophore provided in a predetermined pattern on at least one major planar surface of the transparent panel is provided. Light from at least one light source is coupled to the waveguide and light from the waveguide is coupled to the panel at or adjacent at least one edge of the panel. The resulting illuminated color display panel is useful for general lighting purposes and signage.

12 Claims, 8 Drawing Sheets

MANIPULATION OF COLOR ILLUMINATION USING LIGHT DIFFUSING FIBER

CROSS-REFERENCE TO RELATED APPLICATIONS

This application claims the benefit of priority under 35 U.S.C. §119 of U.S. Provisional Application Ser. No. 61/545,720 filed on Oct. 11, 2011 the content of which is relied upon and incorporated herein by reference in its entirety.

BACKGROUND

This disclosure pertains to illuminated display panels suitable for use as signage or as a general lighting fixture.

Various types of illuminated signage and general purpose lighting fixtures have employed many different types of light sources including neon lamps, incandescent lamps, fluorescent lamps, and light emitting diodes. Also, the use of light diffusing optical fibers in illumination systems has been disclosed. However, illuminated color display panels for signage have not facilitated high resolution, time-varying multiple color displays without the use of relatively expensive matrix-addressable display structures, such as plasma and/or LCD/LED displays, which are highly susceptible to damage and failure in more aggressive environments.

Certain embodiments provide alternative technology for providing relatively inexpensive illuminated color display panels for both general lighting purposes and signage.

SUMMARY

In accordance with certain embodiments, there is provided an illuminated color display panel that includes at least one light diffusing waveguide, at least one light source coupled to the at least one light diffusing waveguide, and a transparent panel having at least one luminophore disposed in a predetermined pattern on at least one major planar surface of the transparent panel. Light emitted from the waveguide is coupled into the panel at or adjacent at least one edge of the panel.

In accordance with certain embodiments, the light source may be an ultraviolet light source or a blue light source that is absorbed by a luminophore disposed on the transparent panel and re-emitted from the luminophore at a different wavelength corresponding to a selected color.

In accordance with certain other embodiments, a plurality of patterns of different luminophores is provided for a multi-colored display.

In accordance with certain other embodiments, a plurality of different light sources are coupled into the waveguide to interact with at least one luminophore.

In accordance with certain embodiments, the intensity of the different light sources or of a single light source may be varied either individually or together to create various desirable visual effects.

In some embodiments, a plurality of light diffusing waveguides are arranged in a bundle, ribbon or cable, with each of the light diffusing waveguides being coupled to a light source.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

Various modifications and alterations may be made in the following examples within the scope of the claims, and aspects of the different examples may be combined in different ways to achieve yet further examples. Accordingly, the true scope of the claims is to be understood from the entirety of the present disclosure, in view of, but not limited to, the embodiments described herein.

The term "flexible light diffusing waveguide" refers to a flexible optical waveguide or (e.g., an optical fiber) employing nano-sized structures that are utilized to scatter or diffuse light out of the sides of the fiber, such that light is guided away from the core of the waveguide and through the outer surfaces of the waveguide to provide illumination. Concepts relevant to the underlying principles of the claimed subject matter are disclosed in U.S. patent application Ser. No. 12/950,045 (United States Patent Application Publication No. US 2011/0122646 A1), which is incorporated in its entirety herein by reference.

The term "light source" refers to a laser, light emitting diode or other component capable of emitting electromagnetic radiation that is either in the visible light range of wavelengths or is of a wavelength that can interact with a luminophore to emit light in the visible wavelength range.

The term "luminophore" refers to an atom or chemical compound that manifests luminescence, and includes a variety of fluorophores and phosphors.

The following terms and phrases are used in connection to light diffusing fibers having nano-sized structures.

The "refractive index profile" is the relationship between the refractive index or the relative refractive index and the waveguide (fiber) radius.

The "relative refractive index percent" is defined as $$\Delta(r)\% = 100 \times [n(r)^2 - n_{REF}^2)]/2n(r)^2,$$

where $n(r)$ is the refractive index at radius r, unless otherwise specified. The relative refractive index percent is defined at 850 nm unless otherwise specified. In one aspect, the reference index $n_{REF}$ is silica glass with a refractive index of 1.452498 at 850 nm, in another aspect it is the maximum refractive index of the cladding glass at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm.

The term "nano-structured fiber region" describes the fiber having a region or area with a large number (greater than 50) of gas filled voids, or other nano-sized structures, e.g., more than 50, more than 100, or more than 200 voids in the cross-section of the fiber. The gas filled voids may contain, for example, $SO_2$, Kr, Ar, $CO_2$, $N_2$, $O_2$, or mixture thereof. The cross-sectional size (e.g., diameter) of nano-sized structures (e.g., voids) as described herein may vary from 10 nm to 1 μm (for example, 50 nm-500 nm), and the length may vary from 1 millimeter 50 meters (e.g., 2 mm to 5 meters, or 5 mm to 1 m range).

Figure 4A:
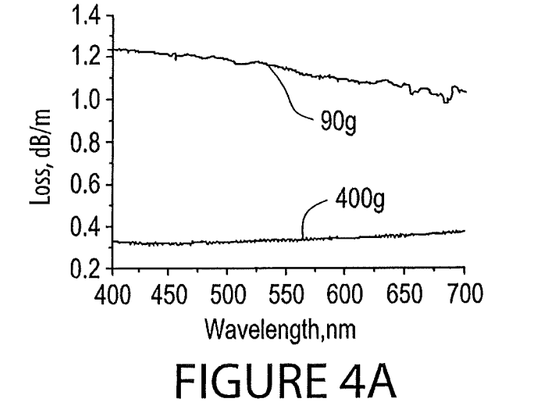
FIGS. 4A and 4B depict fiber attenuation (loss) in dB/m versus wavelength (nm).
Figure 4B:
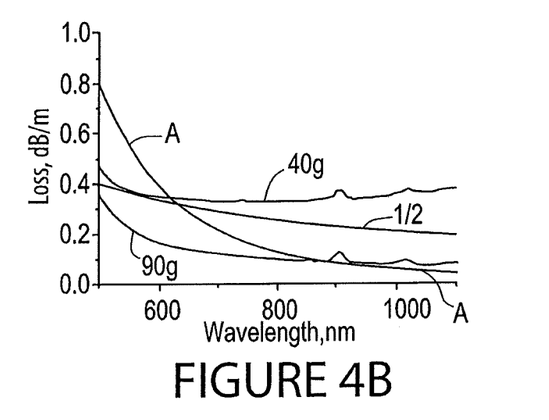

In standard single mode or multimode optical fibers, the losses at wavelengths less than 1300 nm are dominated by Rayleigh scattering. These Rayleigh scattering losses L, are determined by the properties of the material and are typically about 20 dB/km for visible wavelengths (400-700 nm). Rayleigh scattering losses also have a strong wavelength dependence (i.e., $L_S \propto 1/\lambda^4$, see FIG. 4B, comparative fiber A), which means that at least about 1 km to 2 km of the fiber is needed to dissipate more than 95% of the input light. Shorter lengths of such fiber would result in lower illumination efficiency, while using long lengths (1 km to 2 km, or more) can be more costly and can be difficult to manage. The long lengths of fiber, when used in a bioreactor or other illumination system may be cumbersome to install.

In certain configurations of lighting applications it is desirable to use shorter lengths of fiber, for example, 1-100 meters. This requires an increase of scattering loss from the fiber, while being able to maintain good angular scattering properties (uniform dissipation of light away from the axis of the fiber) and good bending performance to avoid bright spots at fiber bends. A desirable attribute of at least some of the embodiments described herein is uniform and high illumination along the length of the fiber illuminator. Because the optical fiber is flexible, it allows a wide variety of the illumination shapes to be deployed. It is preferable to have no bright spots (due to elevated bend losses) at the bending points of the fiber, such that the illumination provided by the fiber does not vary by more than 30%, preferably less than 20% and more preferably less than 10%. For example, in at least some embodiments, the average scattering loss of the fiber is greater than 50 dB/km, and the scattering loss does not vary more than 30% (i.e., the scattering loss is within +30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length. According to at least some embodiments, the average scattering loss of the fiber is greater than 50 dB/km, and the scattering loss does not vary more than 20% (i.e., ±20%) and preferably by not more than 10% (i.e., ±10%) over the fiber segments 0.01 m length.

In at least some embodiments, the intensity variation of the integrated (diffused) light intensity coming through sides of the fiber at the illumination wavelength is less than 30% for the target length of the fiber, which can be, for example, 0.02-100 m length. It is noted that the intensity of integrated light intensity through sides of the fiber at a specified illumination wavelength can be varied by incorporating fluorescent material in the cladding or coating. The wavelength of the light scattering by the fluorescent material is different from the wavelength of the light propagating in the fiber.

In some of the following exemplary embodiments we describe fiber designs with a nano-structured fiber region (region with nano-sized structures) placed in the core area of the fiber, or very close to the core. Some of the fiber embodiments have scattering losses in excess of 50 dB/km (for example, greater than 100 dB/km, greater than 200 dB/km, greater than 500 dB/km, greater than 1000 dB/km, greater than 3000 dB/km, greater than 5000 dB/km), the scattering loss (and thus illumination, or light radiated by these fibers) is uniform in angular space.

In order to reduce or to eliminate bright spots as bends in the fiber, it is desirable that the increase in attenuation at a 90° bend in the fiber is less than 5 dB/turn (for example, less than 3 dB/turn, less than 2 dB/turn, less than 1 dB/turn) when the bend diameter is less than 50 mm. In exemplary embodiment, these low bend losses are achieved at even smaller bend diameters, for example, less than 20 mm, less than 10 mm, and even less than 5 mm. Preferably, the total increase in attenuation is less than 1 dB per 90 degree turn at a bend radius of 5 mm.

Preferably, according to some embodiments, the bending loss is equal to or is lower than the intrinsic scattering loss from the core of the straight fiber. The intrinsic scattering is predominantly due to scattering from the nano-sized structures. Thus, according to at least the bend insensitive embodiments of optical fiber, the bend loss does not exceed the intrinsic scattering for the fiber. However, because the scattering level is a function of bending diameter, the bending deployment of the fiber depends on its scattering level. For example, in some of the embodiments, the fiber has a bend loss less than 3 dB/turn, preferably less than 2 dB/turn, and the fiber can be bent in an arc with a radius as small as 5 mm radius without forming bright spots.

Figure 1:
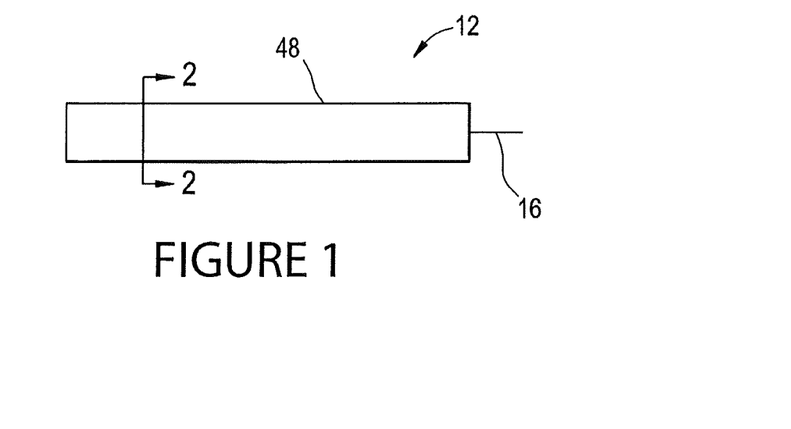
FIG. 1 is a schematic side view of a section of an example embodiment of light-diffusing optical fiber.
Figure 2:
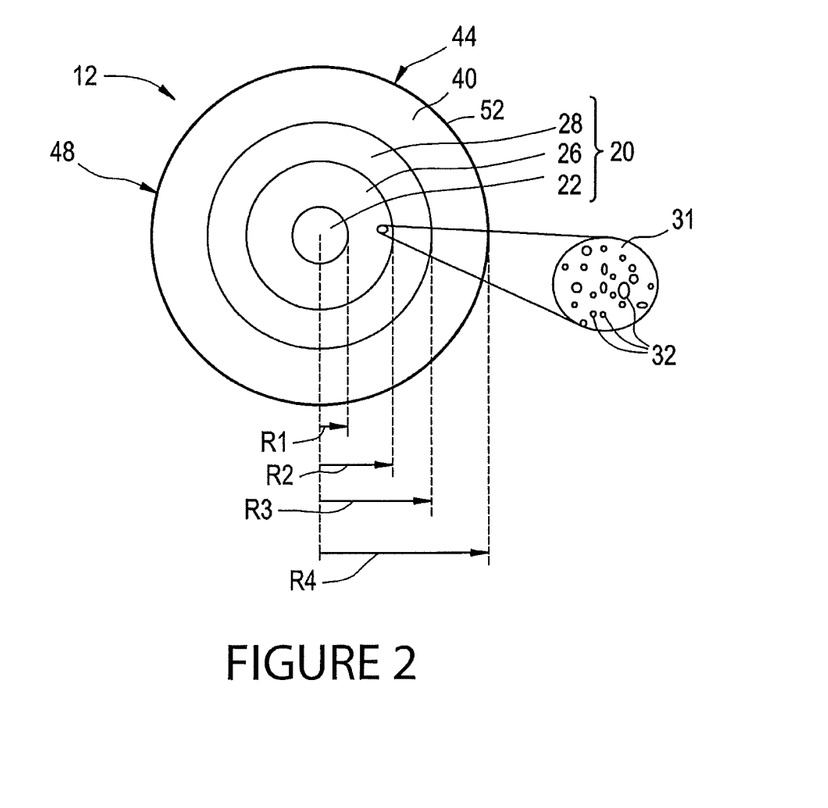
FIG. 2 is a schematic cross-section of the optical fiber of FIG. 1 as viewed along the direction 2-2.

FIG. 1 is a schematic side view of a section of an example embodiment of a light diffusing fiber with a plurality of voids in the core of the light diffusing optical fiber (hereinafter "fiber") 12 having a central axis ("centerline") 16. FIG. 2 is a schematic cross-section of light diffusing optical fiber 12 as viewed along the direction 2-2 in FIG. 1. Light diffusing fiber 12 can be, for example, any one of the various types of optical fiber with a nano-structured fiber region having periodic or non-periodic nano-sized structures 32 (for example voids). In an example embodiment, fiber 12 includes a core 20 divided into three sections or regions. These core regions are: a solid central portion 22, a nano-structured ring portion (inner annular core region) 26, and outer, solid portion 28 surrounding the inner annular core region 26. A cladding region 40 ("cladding") surrounds the annular core 20 and has an outer surface. The cladding 40 may have low refractive index to provide a high numerical aperture (NA). The cladding 40 can be, for example, a low index polymer such as UV or thermally curable fluoroacrylate or silicone.

An optional coating 44 surrounds the cladding 40. Coating 44 may include a low modulus primary coating layer and a high modulus secondary coating layer. In at least some embodiments, coating layer 44 comprises a polymer coating such as an acrylate-based or silicone based polymer. In at least some embodiments, the coating has a constant diameter along the length of the fiber.

In other exemplary embodiments described below, coating 44 is designed to enhance the distribution and/or the nature of "radiated light" that passes from core 20 through cladding 40. The outer surface of the cladding 40 or the outer surface of optional coating 44 represents the "sides" 48 of fiber 12 through which light traveling in the fiber is made to exit via scattering, as described herein.

A protective cover or sheath (not shown) optionally covers cladding 40. Fiber 12 may include a fluorinated cladding 40, but the fluorinated cladding is not needed if the fibers are to be used in short-length applications where leakage losses do not degrade the illumination properties.

In some exemplary embodiments, the core region 26 of light diffusing fiber 12 comprises a glass matrix ("glass") 31 with a plurality of non-periodically disposed nano-sized structures (e.g., "voids") 32 situated therein, such as the example voids shown in detail in the magnified inset of FIG. 2. In another example embodiment, voids 32 may be periodically disposed, such as in a photonic crystal optical fiber, wherein the voids typically have diameters between about $1 \times 10^{-6}$ m and $1 \times 10^{-5}$ m. Voids 32 may also be non-periodically or randomly disposed. In some exemplary embodiment, glass 31 in region 26 is a fluorine-doped silica, while in other embodiment the glass is an undoped pure silica. Preferably the diameters of the voids are at least 10 nm.

The nano-sized structures 32 scatter the light away from the core 20 and toward the outer surface of the fiber. The scattered light is then "diffused" through of the outer surface of the fiber 12 to provide the desired illumination. That is, most of the light is diffused (via scattering) through the sides of the fiber 12, along the fiber length. Preferably, the fiber emits substantially uniform radiation over its length, and the fiber has a scattering-induced attenuation of greater than 50 dB/km in the wavelength(s) of the emitted radiation (illumination wavelength). Preferably, the scattering-induced attenuation is greater than 100 dB/km for this wavelength. In some embodiments, the scattering-induced attenuation is greater than 500 dB/km for this wavelength, and in some embodiments it is greater than 1000 dB/km, greater than 2000 dB/km, or greater than 5000 dB/km. These high scattering losses are about 2.5 to 250 times higher than the Rayleigh scattering losses in standard single mode and multimode optical fibers.

Glass in core regions 22 and 28 may include updopants, such as Ge, Al, and/or P. By "non-periodically disposed" or "non-periodic distribution," it is meant that when one takes a cross-section of the optical fiber (such as shown in FIG. 2), the voids 32 are randomly or non-periodically distributed across a portion of the fiber. Similar cross sections taken at different points along the length of the fiber will reveal different cross-sectional void patterns, i.e., various cross sections will have different voids patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than 10 meters, and in many cases less than 1 meter along the length of the fiber.

The light diffusing fiber 12 as used herein in the illumination system discussed below can be made by methods which utilize preform consolidation conditions which result in a significant amount of gases being trapped in the consolidated glass blank, thereby causing the formation of voids in the consolidated glass optical fiber preform. Rather than taking steps to remove these voids, the resultant preform is used to form an optical fiber with voids, or nano-sized structures, therein. The resultant fiber's nano-sized structures or voids are utilized to scatter or guide the light out of the fiber, via its sides, along the fiber length. That is, the light is guided away from the core 20, through the outer surface of the fiber, to provide the desired illumination.

As used herein, the diameter of a nano-sized structure such as a void is the longest line segment contained within the nano-sized structure whose endpoints are at the boundary of the nano-sized structure when the optical fiber is viewed in perpendicular cross-section transverse to the longitudinal axis of the fiber. A method of making optical fibers with nano-sized voids is described, for example, in U.S. patent application Ser. No. 11/583,098 (United States Patent Application Publication No. 2007/0104437 A1), which is incorporated herein by reference.

As described above, in some embodiments of fiber 12, core sections 22 and 28 comprise silica doped with germanium, i.e., germania-doped silica. Dopants other than germanium, singly or in combination, may be employed within the core, and particularly at or near the centerline 16, of the optical fiber to obtain the desired refractive index and density. In at least some embodiments, the relative refractive index profile of the optical fiber disclosed herein is non-negative in sections 22 and 28. These dopants may be, for example, Al, Ti, P, Ge, or a combination thereof. In at least some embodiments, the optical fiber contains no index-decreasing dopants in the core. In some embodiments, the relative refractive index profile of the optical fiber disclosed herein is non-negative in sections 22, 24 and 28.

In some examples of fiber 12 as used herein, the core 20 comprises pure silica. In one embodiment, a preferred attribute of the fiber is the ability to scatter light out of the fiber (to diffuse light) in the desired spectral range to which biological material is sensitive. In another embodiment, the scattered light may be used for decorative accents and white light applications. The amount of the loss via scattering can be increased by changing the properties of the glass in the fiber, the width of the nano-structured region 26, and the size and the density of the nano-sized structures.

In some examples of fiber 12 as used herein, core 20 is a graded-index core, and preferably, the refractive index profile of the core has a parabolic (or substantially parabolic) shape; for example, in some embodiments, the refractive index profile of core 20 has an α-shape with an α value of about 2, preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm In some embodiments, the refractive index of the core may have a centerline dip, wherein the maximum refractive index of the core, and the maximum refractive index of the entire optical core, is located a small distance away from centerline 16, but in other embodiments the refractive index of the core has no centerline dip, and the maximum refractive index of the core, and the maximum refractive index of the entire optical fiber, is located at the centerline.

Figure 3A:
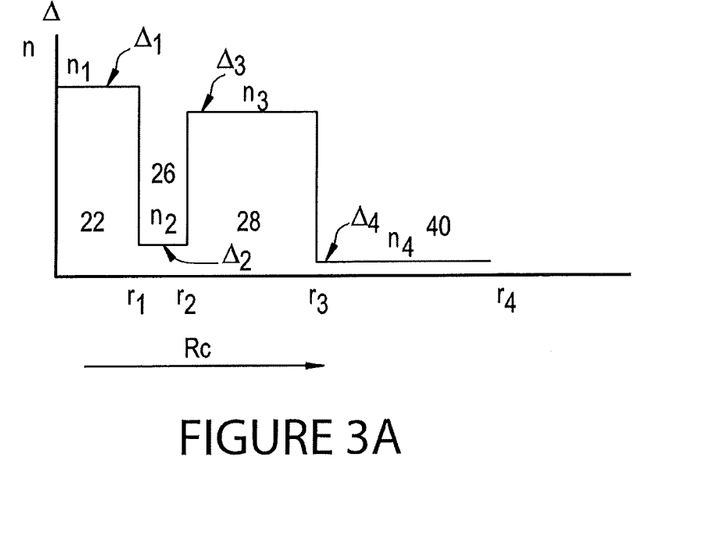
FIG. 3A is a schematic illustration of relative refractive index plot versus fiber radius for an exemplary embodiment of light diffusing fiber.

In an exemplary embodiment, fiber 12 has a silica-based core 20 and depressed index (relative to silica) polymer cladding 40. The low index polymer cladding 40 preferably has a relative refractive index that is negative, more preferably less than −0.5% and even more preferably less than −1%. In some exemplary embodiments cladding 40 has thickness of 20 µm or more. In some exemplary embodiments cladding 40 has a lower refractive index than the core, and a thickness of 10 µm or more (e.g., 20 µm or more). In some exemplary embodiments, the cladding has an outer diameter 2 times Rmax, e.g., of about 125 µm (e.g., 120 µm to 130 µm, or 123 µm to 128 µm). In other embodiments the cladding has a diameter that is less than 120 µm, for example 60 or 80 µm. In other embodiments the outer diameter of the cladding is greater than 200 µm, greater than 300 µm, or greater than 500 µm. In some embodiments, the outer diameter of the cladding has a constant diameter along the length of fiber 12. In some embodiments, the refractive index of fiber 12 has radial symmetry. Preferably, the outer diameter 2R3 of core 20 is constant along the length of the fiber. Preferably the outer diameters of core sections 22, 26, 28 are also constant along the length of the fiber. By constant, we mean that the variations in the diameter with respect to the mean value are less than 10%, preferably less than 5% and more preferably less than 2%. FIG. 3A is a plot of the exemplary relative refractive index Δ versus fiber radius for an example fiber 12 shown in FIG. 2 (solid line). The core 20 may also have a graded core profile, with α-profile having, for example, α-value between 1.8 and 2.3 (e.g., 1.8 to 2.1).

FIG. 3A is a plot of the exemplary relative refractive index Δ versus fiber radius for an example fiber 12 shown in FIG. 2 (solid line). The core 20 may also have a graded core profile, characterized, for example, by an α-value between 1.7 and 2.3 (e.g., 1.8 to 2.3). An alternative exemplary refractive index profile is illustrated by the dashed lines. Core region 22 extends radially outwardly from the centerline to its outer radius, R1, and has a relative refractive index profile $\Delta_1(r)$ corresponding to a maximum refractive index n1 (and relative refractive index percent $\Delta_{1MAX}$). In this embodiment, the reference index $n_{REF}$ is the refractive index at the cladding. The second core region (nano-structured region) 26 has minimum refractive index $n_2$, a relative refractive index profile $\Delta_2(r)$, a maximum relative refractive index $\Delta_{2MAX}$, and a minimum relative refractive index $\Delta_{2MIN}$, wherein some embodiments $\Delta_{2MAX}=\Delta_{2MIN}$. The third core region 28 has a maximum refractive index $n_3$, a relative refractive index profile $\Delta_3(r)$ with a maximum relative refractive index $\Delta_{3MAX}$ and a minimum relative refractive index $\Delta_{3MIN}$, wherein some embodiments $\Delta_{3MAX}=\Delta_{3MIN}$. In this embodiment the annular cladding 40 has a refractive index $n_4$, a relative refractive index profile $\Delta_4(r)$ with a maximum relative refractive index $\Delta_{4MAX}$, and a minimum relative refractive index $\Delta_{4MIN}$. In some embodiments $\Delta_{4MAX}=\Delta_{4MIN}$. In some embodiments, $\Delta_{1MAX}>\Delta_{4MAX}$ and $\Delta_{3MAX}>\Delta_{4MAX}$. In some embodiments $\Delta_{2MIN}>\Delta_{4MAX}$. In the embodiment shown in FIGS. 2 and 3A, $\Delta_{1MAX}>\Delta_{3MAX}>\Delta_{2MAX}>\Delta_{4MAX}$. In this embodiment the refractive indices of the regions have the following relationship $n_1>n_3>n_2>n_4$.

In some embodiments, core regions 22, 28 have a substantially constant refractive index profile, as shown in FIG. 3A with a constant $\Delta_1(r)$ and $\Delta_3(r)$. In some of these embodiments, $\Delta_2(r)$ is either slightly positive ($0<\Delta_2(r)<0.1\%$), negative ($-0.1\%<\Delta_2(r)<0$), or 0%. In some embodiments the absolute magnitude of $\Delta_2(r)$ is less than 0.1%, preferably less than 0.05%. In some embodiments, the outer cladding region 40 has a substantially constant refractive index profile, as shown in FIG. 3A with a constant $\Delta_4(r)$. In some of these embodiments, $\Delta_4(r)=0\%$. The core section 22 has a refractive index where $\Delta_1(r)\geq 0\%$. In some embodiments, the void-filled region 26 has a relative refractive index profile $\Delta_2(r)$ having a negative refractive index with absolute magnitude less than 0.05%, and $\Delta_3(r)$ of the core region 28 can be, for example, positive or zero. In at least some embodiments, $n_1>n_2$ and $n_3>n_4$.

In some embodiments the cladding 40 has a refractive index $-0.05\%<\Delta_4(r)<0.05\%$. In other embodiments, the cladding 40 and the core portions portion 20, 26, and 28 may comprise pure (undoped) silica.

In some embodiments, the cladding 40 comprises pure or F-doped silica. In some embodiments, the cladding 40 comprises pure low index polymer. In some embodiments, nano-structured region 26 comprises pure silica comprising a plurality of voids 32. Preferably, the minimum relative refractive index and the average effective relative refractive index, taking into account the presence of any voids, of nano-structured region 26 are both less than −0.1%. The voids or voids 32 may contain one or more gases, such as argon, nitrogen, oxygen, krypton, or $SO_2$ or can contain a vacuum with substantially no gas. However, regardless of the presence or absence of any gas, the average refractive index in nano-structured region 26 is lowered due to the presence of voids 32. Voids 32 can be randomly or non-periodically disposed in the nano-structured region 26, and in other embodiments, the voids are disposed periodically therein.

In some embodiments, the plurality of voids 32 comprises a plurality of non-periodically disposed voids and a plurality of periodically disposed voids.

In example embodiments, core section 22 comprises germania doped silica, core inner annular region 28 comprises pure silica, and the cladding annular region 40 comprises a glass or a low index polymer. In some of these embodiments, nano-structured region 26 comprises a plurality of voids 32 in pure silica; and in yet others of these embodiments, nano-structured region 26 comprises a plurality of voids 32 in fluorine-doped silica.

In some embodiments, the outer radius, Rc, of core is greater than 10 µm and less than 600 µm. In some embodiments, the outer radius Rc of core is greater than 30 µm and/or less than 400 µm. For example, Rc may be 125 µm to 300 µm. In other embodiments, the outer radius Rc of the core 20 (please note that in the embodiment shown in FIG. 3A, Rc=R3) is larger than 50 µm and less than 250 µm. The central portion 22 of the core 20 has a radius in the range $0.1Rc \leq R_1 \leq 0.9Rc$, preferably $0.5Rc \leq R_1 \leq 09Rc$. The width W2 of the nano-structured ring region 26 is preferably $0.05Rc \leq W2 \leq 0.9Rc$, preferably $0.1Rc \leq W2 \leq 0.9Rc$, and in some embodiments $0.5Rc \leq W2 \leq 0.9Rc$ (a wider nano-structured region gives a higher scattering-induced attenuation, for the same density of nano-sized structures). The solid glass core region 28 has a width Ws=W3 such that $0.1Rc>W3>0.9Rc$. Each section of the core 20 comprises silica based glass. The radial width $W_2$ of nano-structured region 26 is preferably greater than 1 µm. For example, $W_2$ may be 5 µm to 300 µm, and preferably 200 µm or less. In some embodiments, $W_2$ is greater than 2 µm and less than 100 µm. In other embodiments, W2 is greater than 2 µm and less than 50 µm. In other embodiments, $W_2$ is greater than 2 µm and less than 20 µm. In some embodiments, $W_2$ is at least 7 µm. In other embodiments, $W_2$ is greater than 2 µm and less than 12 µm. The width $W_3$ of core region 28 is (R3−R2) and its midpoint $R_{3MID}$ is (R2+R3)/2. In some embodiments, $W_3$ is greater than 1 um and less than 100 µm.

The numerical aperture (NA) of fiber 12 is preferably equal to or greater than the NA of a light source directing light into the fiber. Preferably the numerical aperture (NA) of fiber 12 is greater than 0.2, in some embodiments greater than 0.3, and even more preferably greater than 0.4.

In some embodiments, the core outer radius R1 of the first core region 22 is preferably not less than 24 µm and not more than 50 µm, i.e. the core diameter is between about 48 and 100 µm. In other embodiments, R1>24 microns; in still other embodiments, R1>30 microns; in yet other embodiments, R1>40 microns.

In some embodiments, $|\Delta_2(r)|<0.025\%$ for more than 50% of the radial width of the annular inner portion 26, and in other embodiments $|\Delta_2(r)|<0.01\%$ for more than 50% of the radial width of region 26. The depressed-index annular portion 26 begins where the relative refractive index of the cladding first reaches a value of less than −0.05%, going radially outwardly from the centerline. In some embodiments, the cladding 40 has a relative refractive index profile $\Delta_4(r)$ having a maximum absolute magnitude less than 0.1%, and in this embodiment $\Delta_{4MAX}<0.05\%$ and $\Delta_{4MIN}>-0.05\%$, and the depressed-index annular portion 26 ends where the outermost void is found.

Cladding structure 40 extends to a radius R4, which is also the outermost periphery of the optical fiber. In some embodiments, the width of the cladding, R4−R3, is greater than 20 µm; in other embodiments R4−R3 is at least 50 µm, and in some embodiments, R4−R3 is at least 70 µm.

In another embodiment, the entire core 20 is nano-structured (filled with voids, for example), and the core 20 is surrounded by the cladding 40. The core 20 may have a "step" refractive index delta, or may have a graded core profile, with α-profile having, for example, α-value between 1.8 and 2.3.

Preparation of optical preform and fibers for examples shown in FIGS. 3C, 4A and 6-8 were as follows: In this exemplary embodiment, 470 grams of $SiO_2$ (0.5 g/cc density) soot were deposited via outside vapor deposition (OVD) onto a fully consolidated 1 meter long, 20 mm diameter pure silica void-free core cane, resulting in a preform assembly (sometimes referred to as a preform, or an optical preform) comprising a consolidated void-free silica core region which was surrounded by a soot silica region. The soot cladding of this preform assembly was then sintered as follows. The preform assembly was first dried for 2 hours in an atmosphere comprising helium and 3 percent chlorine (all percent gases by volume) at 1100° C. in the upper-zone part of the furnace, followed by down driving at 200 mm/min (corresponding to approximately a 100° C./min temperature increase for the outside of the soot preform during the downdrive process) through a hot zone set at approximately 1500° C. in a 100 percent $SO_2$ (by volume) sintering atmosphere. The preform assembly was then down driven again (i.e., a second time) through the hot zone at the rate of 100 mm/min (corresponding to an approximately 50° C./min temperature increase for the outside of the soot preform during the downdrive process). The preform assembly was then down driven again (i.e., a third time) through the hot zone at the rate of 50 mm/min (corresponding to an approximately 25° C./min temperature increase for the outside of the soot preform during the downdrive process). The preform assembly was then down driven again (i.e., a fourth time) through the hot zone at the rate of 25 mm/min (corresponding to an approximately 12.5° C./min temperature increase for the outside of the soot preform during the downdrive process), then finally sintered at 6 mm/min (approximately 3° C./min heat up rate) in order to sinter the soot into an $SO_2$-seeded silica overclad preform.

Following each downdrive step, the preform assembly was updriven at 200 mm/min into the upper-zone part of the furnace (which remained set at 1100° C.). The first series of higher downfeed rate are employed to glaze the outside of the optical fiber preform, which facilitates trapping of the gases in the preform. The preform was then placed for 24 hours in an argon purged holding oven set at 1000° C. to outgas any remaining helium in the preform. This preform was then redrawn in an argon atmosphere on a conventional graphite redraw furnace set at approximately 1700° C. into void-free $SiO_2$ core, $SO_2$-seeded (i.e., containing the non-periodically located voids containing $SO_2$ gas) silica overclad canes which were 10 mm in diameter and 1 meter long.

One of the 10 mm canes was placed back in a lathe where about 190 grams of additional $SiO_2$ (0.52 g/cc density) soot was deposited via OVD. The soot of this cladding (which may be called overcladding) for this assembly was then sintered as follows. The assembly was first dried for 2 hours in an atmosphere consisting of helium and 3 percent chlorine at 1100° C. followed by down driving at 5 mm/min through a hot zone set at 1500° C. in a 100% helium (by volume) atmosphere in order to sinter the soot to a germania containing void-free silica core, silica $SO_2$-seeded ring (i.e. silica with voids containing $SO_2$), and void-free overclad preform. The preform was placed for 24 hours in an argon purged holding oven set at 1000° C. to outgas any remaining helium from the preform. The optical fiber preform was drawn to 3 km lengths of 125 micron diameter optical fiber at approximately 1900° C. to 2000° C. in a helium atmosphere on a graphite resistance furnace. The temperature of the optical preform was controlled by monitoring and controlling the optical fiber tension; in this embodiment the fiber tension was held at one value between 30 and 600 grams during each portion (e.g., 3 km lengths) of a fiber draw run. The fiber was coated with a low index silicon based coating during the draw process.

Another 10 mm void-free silica core $SO_2$-seeded silica overclad canes described above (i.e., a second cane) was utilized to manufacture the optical preform and fibers for examples shown in FIG. 4B. More specifically, the second 10 mm void-free silica core $SO_2$-seeded silica overclad cane was placed back in a lathe where about 3750 grams of additional $SiO_2$ (0.67 g/cc density) soot are deposited via OVD. The soot of this cladding (which may be called overcladding for this assembly) was then sintered as follows. The assembly was first dried for 2 hours in an atmosphere comprising of helium and 3 percent chlorine at 1100° C., followed by down driving at 5 mm/min through a hot zone set at 1500° C. in a 100% helium (by volume) atmosphere in order to sinter the soot so as to produce preform comprising germania containing void-free silica core, silica $SO_2$-seeded ring (i.e. silica with voids containing $SO_2$), and void-free overclad. The resultant optical fiber preform was placed for 24 hours in an argon purged holding oven set at 1000° C. to outgas any remaining helium from the preform. Finally, the optical fiber preform was drawn to 5 km lengths of 125 micron diameter optical fiber and coated with the low index polymer as described above.

Figure 3B:
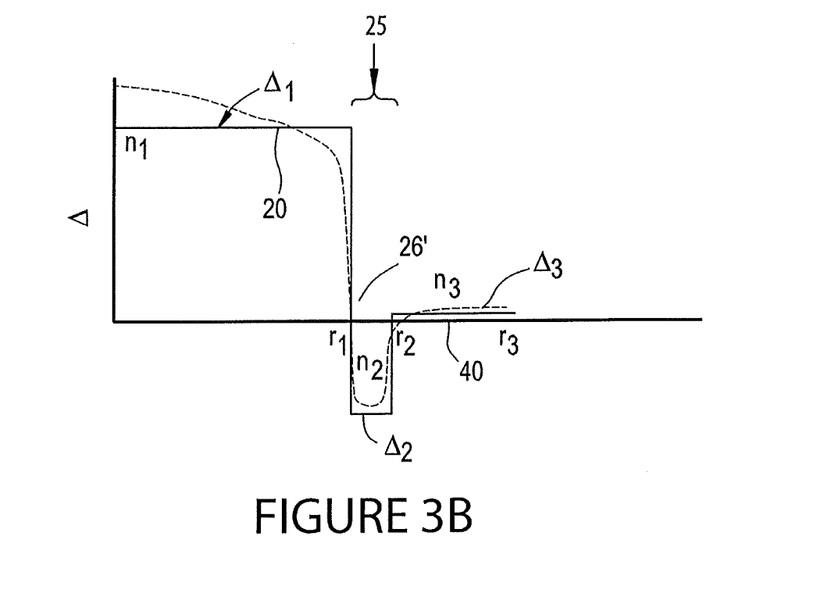
FIG. 3B is a schematic illustration of relative refractive index plot versus fiber radius for another exemplary embodiment of light diffusing fiber.

FIG. 3B illustrates schematically yet another exemplary embodiment of light diffusing fiber 12. The fiber of FIG. 3B includes a core 20 with a relative refractive index $\Delta_1$, a nanostructured region 26' situated over and surrounding the core 20. The core 20 may have a "step" index profile, or a graded core profile, with α-profile having, for example, α-value between 1.8 and 2.3.

In this exemplary embodiment (see FIG. 3B) the nanostructured region 26' is an annular ring with a plurality of voids 32. In this embodiment, the width of region 26' can be as small as 1-2 um, and may have a negative average relative refractive index $\Delta_2$. Cladding 40 surrounds the nano-structured region 26'. The (radial) width of cladding 40 may be as small as 1 μm, and the cladding may have either a negative, a positive or 0% relative refractive index, (relative to pure silica). The main difference between examples in FIGS. 3A and 3B is that nano-structured region in shown in FIG. 3A is located in the core 20 of the light diffusing fiber 12, and in FIG. 3B it is located at the core/clad interface. The depressed-index annular portion 26' begins where the relative refractive index of the core first reaches a value of less than –0.05%, going radially outwardly from the centerline. In the embodiment of FIG. 3B, the cladding 40 has a relative refractive index profile $\Delta_3(r)$ having a maximum absolute magnitude less than 0.1%, and in this embodiment $\Delta_{3MAX}<0.05\%$ and $\Delta_{3MIN}>-0.05\%$, and the depressed-index annular portion 26 ends where the outmost void occurs in the void-filled region.

In the embodiment shown in FIG. 3B the index of refraction of the core 20 is greater than the index of refraction $n_2$ of the annular region 26', and the index of refraction $n_1$ of the cladding 40 is also greater than the index of refraction $n_2$.

Figure 3C:
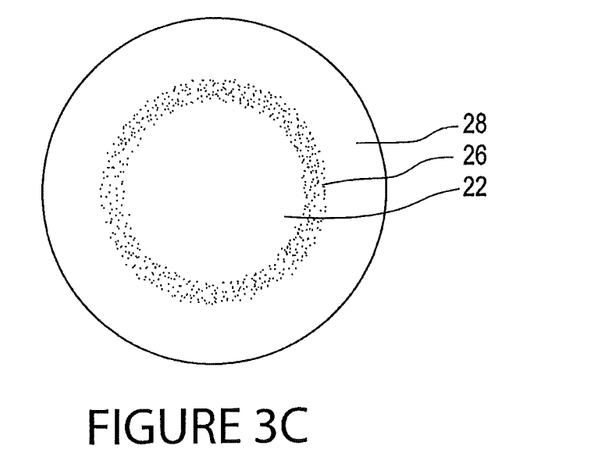
FIG. 3C is illustrates another exemplary embodiment of a light diffusing fiber.

FIG. 3C illustrates a core 20 of one embodiment of an optical fiber 12 that has been made. This fiber has a first core region 22 with an outer radius R1 of about 33.4 μm, a nano-structured region 26 with an outer radius R2=42.8 μm, a third core region 28 with an outer radius R3=62.5 μm, and a polymer cladding 40 with an outer radius R4 (not shown) of 82.5 μm). In this embodiment, the material of the core is pure silica (undoped silica), the material for cladding was low index polymer (e.g., UV curable silicone having a refractive index of 1.413 available from Dow-Corning of Midland, Mich. under product name Q3-6696) which, in conjunction with the glass core, resulted in fiber NA of 0.3. The optical fiber 12 had a relatively flat (weak) dependence on wavelength, compared to standard single-mode transmission fiber, such as for example SMF-28e$^R$ fiber, FIG. 4B. In standard single mode (such as SMF-28$^R$) or multimode optical fibers, the losses at wavelengths less than 1300 nm are dominated by Rayleigh scattering. These Rayleigh scattering losses are determined by the properties of the material and are typically about 20 dB/km for visible wavelengths (400-700 nm). The wavelength dependence of Rayleigh scattering losses is proportional to $\lambda^{-p}$ with p≈4. The exponent of the wavelength dependent scattering losses in the fiber comprising at least one nanostructured region is less than 2, preferably less than 1 over at least 80% (for example greater than 90%) in the 400 nm-1100 nm wavelength range. The average spectral attenuation from 400 nm to 1100 nm was about 0.4 dB/m when the fiber was drawn with at 40 g tension and was about 0.1 dB/m when the fiber 12 was drawn at 90 g tension. In this embodiment, the nano-sized structures contain $SO_2$ gas. Applicants found that filled $SO_2$ voids in the nano-structured ring greatly contribute to scattering. Furthermore, when $SO_2$ gas was used to form the nano-structures, it has been discovered that this gas allows a thermally reversible loss to be obtained, i.e., below 600° C. the nano-structured fiber scatters light, but above 600° C. the same fiber will guide light. This unique behavior that $SO_2$ imparts is also reversible, in that upon cooling the same fiber below 600° C., the fiber 12 will act as light diffusing fiber and will again generate an observable scattering effect.

In preferred embodiments, the uniformity of illumination along the fiber length is controlled such that the minimum scattering illumination intensity is not less than 0.7 of the maximum scattering illumination intensity, by controlling fiber tension during the draw process; or by selecting the appropriate draw tension (e.g., between 30 g and 100 g, or between 40 g and 90 g)

Accordingly, according to some embodiments, a method of making a light diffusing fiber to control uniformity of illumination along the fiber length wherein the minimum scattering illumination intensity is not less than 0.7 the maximum scattering illumination intensity includes the step of controlling fiber tension during draw process.

The presence of the nano-sized structures in the light diffusing fiber 12 creates losses due to optical scattering, and the light scattering through the outer surface of the fiber can be used for illumination purposes. FIG. 4A is a plot of the attenuation (loss) in dB/m versus wavelength (nm) for the fiber of FIG. 3C (fiber with $SO_2$ gas filled voids). FIG. 4A illustrates that (i) light diffusing fibers 12 can achieve very large scattering losses (and thus can provide high illumination intensity) in the visible wavelength range. The scattering losses of the optical fiber 12 also have weak wavelength dependence ($L_s$ is proportional to $1/\pi^{-p}$, where p is less than 2, preferably less than 1, and even more preferably less than 0.5), as compared to regular 125 µm graded index core multi mode comparative fiber A (fiber A is a step index multimode fiber without the nano-structured region) which has Rayleigh scattering losses of about 0.02 dB/m in the visible wavelength range, or about 20 dB/km at the wavelength of 500 nm and relatively strong wavelength dependence of $1/\lambda^4$). The effect of the tension for the fibers 12 is also illustrated in FIGS. 4A-4B. More specifically FIGS. 4A-4B illustrate that the higher fiber draw tension results in lower scattering losses, and that lower fiber draw tension results in a fiber section with higher scattering loss, i.e., stronger illumination). FIG. 4A depicts attenuation as function of wavelength for light diffusing fiber 12 (with voids in the core) drawn at different fiber tensions of 90 and 400 g. FIG. 4B depicts attenuation as function of wavelength for different light diffusing fiber 12 (with voids in the core) drawn at different fiber tension, 90 and 40 g, a comparative multiple mode fiber (fiber A) with normalized loss, and a theoretical fiber with $1/\lambda$ loss dependence. (Note, FIG. 4B graph describes wavelength dependence of the loss. In this example, in order to compare the slope of the scattering for the light fiber 12 and fiber A, the loss of low loss fiber (fiber A) was multiplied by a factor of 20, so that the two plots can be easily shown on the same Figure.) Without being bound to any particular theory, it is believed that the increase in the scattering losses when the draw tension decreases, for example from 90 g to 40 g, is due to an increase in the average diameter of the nanostructures. Therefore, this effect of fiber tension could be used to produce constant attenuation (illumination intensity) along the length of the fiber by varying the fiber tension during the draw process. For example, a first fiber segment drawn at high tension, T1, with a loss of $\alpha_1$ dB/m and length, L1, will attenuate the optical power from an input level P0 to P0 exp($-\alpha_1$*L1/4.343). A second fiber segment optically coupled to the first fiber segment and drawn at lower tension T2 with a loss of $\alpha_2$ dB/m and length L2 will further attenuate the optical power from P0 exp($-\alpha_1$*L1/4.343) to P0 exp($-\alpha_1$*L1/4.343) exp($-\alpha_2$*L2/4.343). The lengths and attenuations of the first and second fiber segments can be adjusted to provide uniform intensity along the length of the concatenated fiber.

Figure 5:
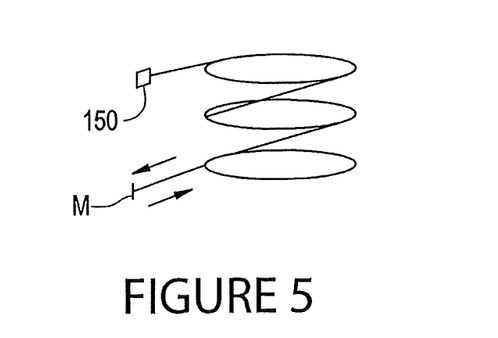
FIG. 5 illustrates a fiber deployment that utilizes two light passes within a single fiber.
Figure 6A:
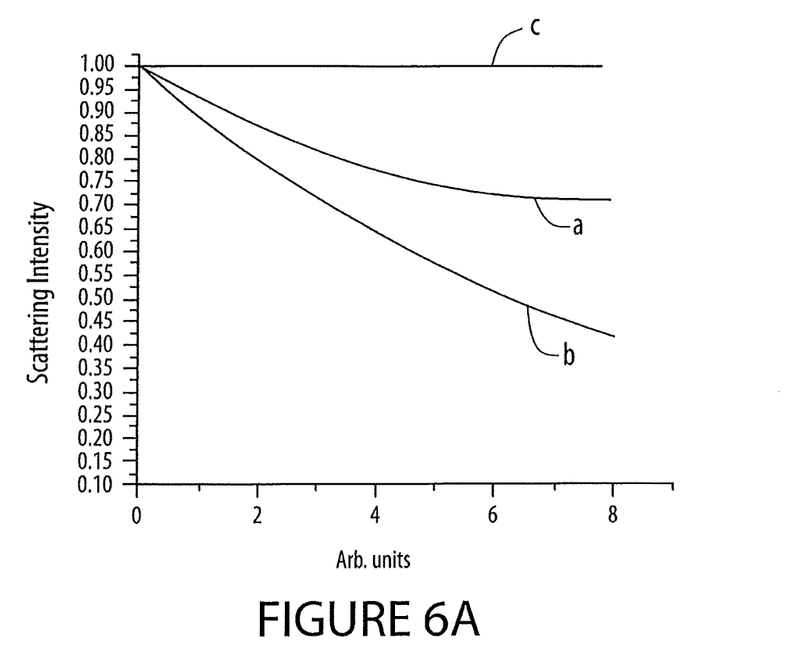
FIG. 6A illustrates the intensity distribution along the fiber when the fiber made with uniform tension (example A) and variable tension (example B).
Figure 6B:
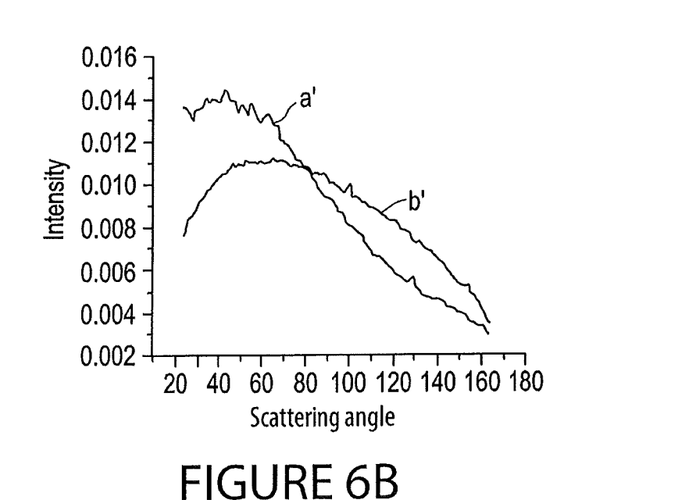
FIG. 6B illustrates the scattering distribution function with white ink and without ink.

One of the advantages of light diffusing fibers 12 is their ability to provide uniform illumination along the length of the light diffusing fiber. FIG. 5 illustrates the arrangement of fiber 12 that results in uniform illumination along the length of the fiber and utilizes two light passes in the single light diffusing fiber 12. In this arrangement a mirror M is placed at the end of the light diffusing fiber 12. The input light provided by the light source 150 to the light diffusing fiber 12 propagates along the axis of the light diffusing fiber 12, and the remaining light is reflected by the mirror and propagates back along the axis of the fiber 12 towards the input. If the attenuation and length of the fiber 12 are chosen properly, the light output power provided back to the light source is less than a 2%-5% percent of the original light power. The scattering loss intensity for fiber with constant loss distribution (see FIG. 4A) may be higher in the beginning of the fiber and weaker at the end of the fiber. However, if the light diffusing fiber 12 is drawn with a periodically controlled tension (the tension value is related to the furnace temperature, which may vary from 1800° C. to 2100° C.) such that the scattering losses are lower at the beginning of the fiber, where the intensity is high, and higher at the end, where the intensity is lower, the resulting scattering intensity can be made less variable, or constant (for example, as shown in FIG. 6A, example C). The fiber draw tension may be controlled and varied, for example, between 40 g and 400 g, thus providing a wide range of scattering-induced attenuation (e.g., up to 6 times). The mirror M in FIG. 5 may also be replaced by a second light source with power density output that similar to that of the first light source (within a factor of 2, i.e., in the range of 50% to 200%) to not only create a more uniform illumination, but also to increase the quantity of light scattered by the fiber.

Figure 7:
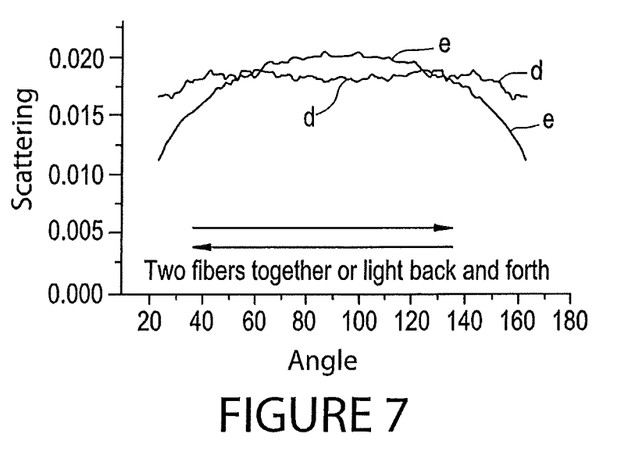
FIG. 7 illustrates scattering for fiber shown in FIG. 5 (with reflective mirror at coupled to the rear end of the fiber), and also for a fiber utilizing white ink in its coating.

One aspect of an exemplary embodiment of the bioreactor/illumination system is that the angular distribution of the scattering light intensity is uniform or nearly uniform in angular space. The light scattering axially from the surface of the fiber has a variation relative to the mean scattering intensity that is less than 50%, preferably less than 30%, preferably less than 20% and more preferably less than 10%. The dominant scattering mechanism in conventional silica-based optical fibers without nano-sized structures is Rayleigh scattering, which has a broad angular distribution. Fibers 12 in which there are additional scattering losses due to voids in nano-structured ring may have a strong forward component, as shown in FIG. 6A (embodiments a and b) and FIG. 6B (embodiment a'). This distribution, however, can be corrected by placing a scattering material on the top of coating of the light diffusing fiber 12. Light diffusing fibers made with coating containing $TiO_2$ based white ink (see FIG. 6B, embodiment b') provide an angular distribution of scattered light that is significantly less forward biased. With an additional thicker layer of $TiO_2$ ink (e.g., 1-5 µm) it is possible to further reduce the forward scattering component, thereby increasing the uniformity of the angular intensity distribution. However, as shown in FIG. 7, if the illuminator design may utilize fiber(s) optically coupled to a back reflective mirror or additional light source (see FIG. 5), so even if the fiber has no $TiO_2$ based white ink coating layer this configuration provides relatively flat (i.e., very uniform) angular scattering intensity (see FIG. 6A). In some embodiments, a controlled variation of the ink coating (either thickness of the ink coating or variation of ink concentration in the coating) along the length of the fiber will provide an additional way of making more uniform variation in the intensity of the light scattered form the fiber at large angles (more than 15 degrees).

In some embodiments the ink can be a fluorescent material that converts scattered light to a longer wavelength of light. In some embodiments white light can be emitted (diffused out of the outer surface) by the fiber 12 by coupling the light diffusing fiber 12 with such a coating to a UV light source, for example a 405 nm or 445 nm diode laser. The angular distribution of fluorescence white light in the exemplary embodiments is substantially uniform (e.g., 25% to 400%, preferably 50% to 200%, even more preferably 50% to 150%, or 70% to 130%, or 80% to 120% in angular space).

Efficient coupling to low cost light sources such as light emitting diodes (LEDs) or sunlight requires the fiber to have a high NA and large core diameter. With a design similar to that shown in FIG. 2 the size of the multimode core 20 can be maximized, and may have a radius up to 500 µm. The cladding thickness may be much smaller, for example, about 15-30 µm (e.g., about 20 µm). For example, according to one embodiment, a plurality of light diffusing fibers 12 may be wound around a support structure, and each light diffusing optical fiber may be optically coupled to either the light source or a plurality of light sources. The plurality of light diffusing optical fibers 12 can be bundled together in at least one of: a ribbon, ribbon stack, or a round bundle. The fiber bundles or ribbons (i.e., collections of multiple fibers) can also be arranged in the shape of the light source in order to increase coupling efficiency. A typical bundle/ribbon structure can include, for example, 2-36 light diffusing fibers 12, or may include up to several hundred fibers 12. Cable designs which are assemblies of multiple fibers are well known and could include ribbons, collections of multiple ribbons, or fibers gathered into a tube. Such fibers may include one or more light diffusing fibers 12.

Figure 8A:
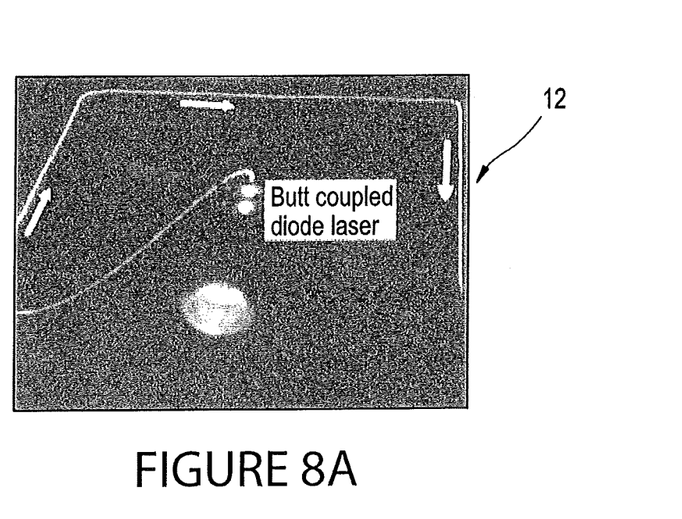
FIG. 8A illustrates an exemplary embodiment of an illumination system.

A bright continuous light source coupled into a light diffusing fiber can be utilized for different application such as signs, or display illumination. If the illumination system utilizes a single fiber 12 with core diameter of 125-300 µm, a multimode laser diode could be used as a light source for providing light into the fiber 12. An exemplary lighting fixture (bright perimeter illuminator for the display screen) using a single fiber 12 with a reflective coating directing light in one direction is shown in FIG. 8A. According to some embodiments, single or multiple fiber illumination with the light diffusing fiber(s) 12 can be utilized in aqueous environments, for example for lighting boat docks, fishing lines or lures, and related applications where the small flexible size of the light diffusing fiber 12 and the ability to be safely immersed in water are highly desirable. The light diffusing fiber 12 may also be useful for exit lighting, illuminating pathways, emitting IR radiation for room detectors, or used a thread in clothing, particularly protective/reflective clothing to further enhance visibility of the wearer. Examples of the use of the light diffusing fiber 12 in decorative illumination are manifold, but a few examples are use in appliance lighting and edge effects, automotive/aircraft illumination, or household and furniture illumination.

Figure 8B:
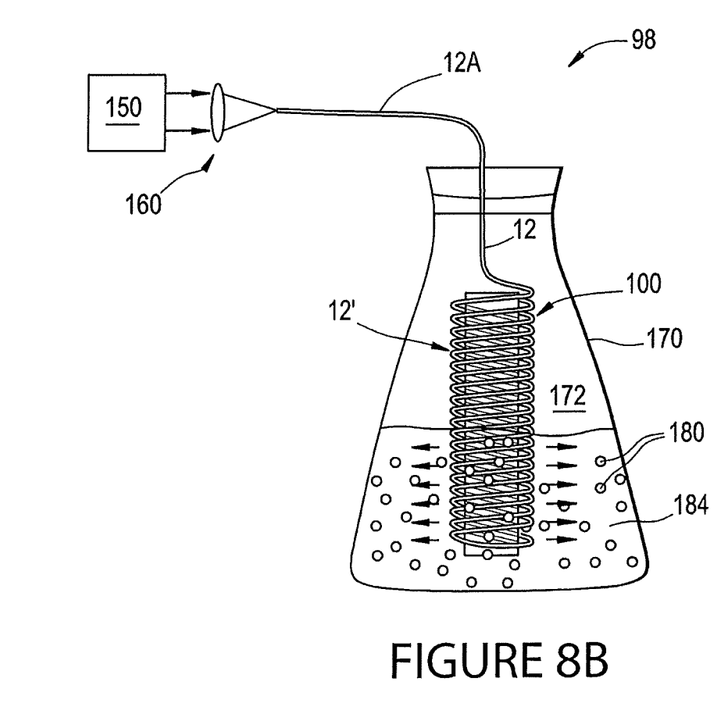
FIG. 8B illustrates an example embodiment of an illumination system as used in combination with a biological chamber in the form of a flask.

FIG. 8B illustrates an example embodiment of a biological growth system 98 and an illumination system 100 as used in the biological growth system, wherein biological chamber 170 is in the form of a flask with an interior 172. The light source 150 and optical coupling system 160 are configured to couple light from the light source into the input ends of light conducting fiber. The output end of the low-scatter light conducting fiber 12A is coupled to the input end of the light diffusing fiber 12 (light source fiber). In the embodiment of FIG. 8B, the light-source fiber 12 is formed from a single counter-wound fiber. It is noted that the fiber 12 can wound around a support structure to form a light-source fiber portion where guided light is scattered from the fiber outer surface to form an extended light source that emits substantially uniform radiation. The bends in the light-source fiber portion are formed to enhance the amount of scattering in the light diffusing fiber 12. Counter-winding at least one fiber can increase the uniformity of the radiation by compensating for the effects of decreasing emitted radiation along the length of the light-source fiber portion. Multiple fibers 12 can be wound in sequence around a support structure, with each fiber coupled to the light source, can be used to form a lengthy extended source. The light diffusing fiber 12 can be configured to suit a variety of biological chamber geometries and provides light to the biological material growth of biological material 180. The biological material 180 may be, for example, algae (e.g., algae colonies, algae blooms) or bacteria (e.g., cyanobacteria). In an example embodiment, biological material 180 may be suspended in a support medium 184 such as water.

In an example embodiment, fiber 12 may include a coating 44 as discussed above in connection with FIG. 2. In one exemplary embodiment, coating 44 includes a hydrophilic coating layer such as a UV-cured acrylate coating that provides improved wet adhesion. The coating layer may be UV curable coatings comprising a low modulus primary coating layer (typically <3 MPa) adjacent to the glass and a higher modulus secondary coating layer (typically >50 MPa). The higher modulus secondary coating layer is adjacent to, and situated over the primary (lower modulus) coating layer. Other, or additional coatings, applied either as a single layer coating or as a layer in a multi-layer coating may also be utilized. Examples of such materials are hydrophilic coating 44A (not shown) which serves as a cell growth medium or a coating containing a material to provide additional scattering to the escaped light. These coatings may also serve as a protective covering for the fiber 12.

Exemplary hydrophilic coatings 44A for use in coating 44 are those commonly used for improving cell adhesion and growth to surfaces and contain carboxylic acid functionality and amine functionality (e.g. formulations containing acrylic acid or acrylamides). In addition, hydrophilic coatings 44A may be enhanced by serving as a reservoir for nutrients essential for the growth of biological material.

In some exemplary embodiments, coating 44 includes fluorescent or ultraviolet absorbing molecules that serve to modify radiated light. Suitable up or down converter molecules may also be included in the coating to produce light of differing wavelengths from that of the input light source. Ink coating layers may also be applied to alter the color or hue of the emitted light. Other coating embodiments include molecules capable of providing additional scattering to the light emitted from the fiber. A further embodiment may be the inclusion of photo-active catalysts onto the coating that may be used to increase the rate of photo-reactions. One example of just such a catalyst is rutile $TiO_2$, as a photo-catalyst.

According to some embodiments, light diffusing fibers 12 may be enclosed within a polymeric, metal, or glass covering (or coatings), wherein said the coating or covering has a minimum outer dimension (e.g., diameter) greater than 250 µm. If the fiber(s) has a metal coating, the metal coating may contain open sections, to allow light to be preferentially directed into a given area. These additional coatings or coverings may also contain additional compounds to vary the emitted light or catalyze reactions in the same manner as described above for the coatings coated on the fiber.

As stated above, the light diffusing fiber 12 may comprise a hydrophilic coating disposed on the outer surface of the optical fiber. Also, fluorescent species (e.g., ultraviolet-absorbing material) may be disposed in the optical fiber coating, as well as molecules capable of providing additional scattering of the emitted light. According to some embodiments the light source coupled to the light diffusing fiber 12 generates light in 200 nm to 500 nm wavelength range and the fluorescent material (fluorescent species) in the fiber coating generates either white, green, red, or MR (near infrared) light.

Furthermore, an additional coating layer may be provided on the fiber outer surface. This layer may be configured to modify the radiated light, alter the interaction of the coating materials. Examples of just such a coating would be coatings containing materials such as, but not limited to, poly(2-acrylamido-2-methanesulfonic acid), ortho-nitrobenzyl groups, or azobenzene moities respectively.

Some exemplary embodiments of an illumination system include: (i) a light source that generates light having at least one wavelength λ within the 200 nm to 2000 nm range; and (ii) at least one light diffusing optical fiber 12. The fiber 12 comprises having a core, cladding, and a plurality of nano-sized structures 32 situated within the core or at a core-cladding boundary. This optical fiber further includes an outer surface, and at least one end optically coupled to the light source. As described above, the light diffusing optical fiber 12 is configured to scatter guided light via the nano-sized structures such as voids away from the core and through the outer surface, to form a light-source fiber portion having a length that emits substantially uniform radiation over its length. The light diffusing optical fiber 12 has a scattering-induced attenuation greater than 50 dB/km for one or more wavelength(s) within the 200 nm to 2000 nm range (e.g. 400-700 nm, or 1 μm to 2 μm). The fiber 12 may have a plurality of bends formed therein so as to preferentially scatter light via the nano-sized structures 32 away from the core 20 and through the outer surface within specified area(s). Preferably, the deviation of the illumination intensity of scattered light is less than 30% of the maximum scattering illumination intensity along the length. According to some embodiments the scattering-induced attenuation is between 100 dB/km and 6000 dB/km, or higher. In some embodiments, attenuation due to scattering of fiber 12 is 6000 dB/km to 20000 dB/km for the one or more wavelength(s) situated within 200 nm to 2000 nm range. According to some embodiments fiber 12 has a length between 0.5 m and 100 m and the scattering-induced attenuation is between 300 dB/km and 5000 dB/km for the one or more wavelength(s) situated within 200 nm to 2000 nm range, and/or is greater than 3 dB/length of fiber. In other embodiments, the fiber 12 has a length between 0.1 m and 0.5 m and the scattering-induced attenuation is between 5000 dB/km and 20,000 dB/km for the one or more wavelength(s) situated within 200 nm to 2000 nm range. Preferably, the nano-sized structures 32 are gas filled voids (e.g., $SO_2$ filled voids) with diameter of greater than 10 nm, preferably greater than 50 nm, more preferably greater than 100 nm. Preferably the fiber cladding is either glass, or polymer, and is at least 20 μm thick. The cladding, in combination with said core, provides a NA of 0.2 or greater. As described above, uniformity of illumination along the fiber length (with about 30% from maximum intensity, and preferably within about 20% from maximum intensity, and more preferably within about 10% from maximum intensity) can be accomplished by controlling the fiber tension during the draw process. As previously discussed, the uniformity of the illumination can be further reduced by utilizing a reflector coupled to the end of the fiber that is opposite to the end of the fiber coupled to the optical source.

Thus, according to some embodiments, the light diffusing fiber 12 includes a core at least partially filled with nanostructures for scattering light, a cladding surrounding the core, and at least one coating surrounding the cladding. For example, the core and cladding may be surrounded by a primary and secondary coating layers, and/or by an ink layer. In some embodiments the ink layer contains pigments to provide additional absorption and modify the spectrum of the light scattered by the fiber (e.g., to provide additional color(s) to the diffused light). In other embodiments, one or more of the coating layers comprises molecules which convert the wavelength of the light propagating through the fiber core such that the light emanating from the fiber coating (light diffused by the fiber) is at a different wavelength. In some embodiments the ink layer and/or the coating layer may comprise phosphor in order to convert the scattered light from the core into light of differing wavelength(s). In some embodiments the phosphor and/or pigments are dispersed in the primary coating. In some embodiments the pigments are dispersed in the secondary coating, in some embodiments the pigments are dispersed in the primary and secondary coatings. In some embodiments the phosphor and/or pigments are dispersed in the polymeric cladding. Preferably, the nanostructures are voids filled $SO_2$.

According to some embodiments the optical fiber 12 includes a primary coating, an optional secondary coating surrounding the primary coating and/or an ink layer (for example located directly on the cladding, or on one of the coatings. The primary and/or the secondary coating may comprise at least one of pigment, phosphors, fluorescent material, UV absorbing material, hydrophilic material, light modifying material, or a combination thereof.

The plurality of light diffusing fibers 12 can be bundled together in at least one of: a ribbon, ribbon stack, or a round bundle. The fiber bundles or ribbons (i.e., collections of multiple fibers) can also be arranged in the shape of the light source in order to increase coupling efficiency. A typical bundle/ribbon structure can include, for example 2 to 36 light diffusing fibers 12, or, with overstacking of fibers, may include up to several hundreds of fibers 12.

As stated above, the optical fiber may comprise a hydrophilic coating disposed on the outer surface of the optical fiber. Alternatively, a hydrophilic coating may be disposed on the outer surface of the fiber ribbon. A ribbon may also be arranged in the shape of the light source, to provide better coupling between the light diffusing fibers 12 and the light source. An advantage derived from the ribbon structure is that winding of the individual fibers may not be necessary, because the ribbons may form bent structures such as waves, helices, or spirals thereby allowing light to scatter into desired areas. Furthermore, the use of multi-fiber ribbons affords the possibility of having large stacks of ribbons. Such ribbon stacks would provide a more concentrated amount of light, and also open the possibility to the use of different light sources, such as red lasers, sunlight, light emitting diodes, or guidance of point light sources. For example, according to one embodiment, a plurality of light diffusing optical fibers 12 may be optically coupled to either a single light source or a plurality of light sources, while the light diffusing optical fibers 12 are bundled together in at least one of: a ribbon, ribbon stack, or a round bundle. Furthermore the bundles or ribbons of light diffusing fibers 12 may be connected to a light source(s) by a transmission fiber capable of directing the light towards the light diffusing fiber with a minimum of loss. This latter configuration can be expected to be very useful for remote lighting applications where light is gathered from a source distant from the area where light is to be delivered.

According to some embodiments, a light diffusing optical fiber includes: (1) a glass core, a cladding, and a plurality of nano-sized structures situated within said core or at a core-cladding boundary, the optical fiber further including an outer surface and is configured to (i) scatter guided light via said nano-sized structures away from the core and through the outer surface, (ii) have a scattering-induced attenuation greater than 50 dB/km at illumination wavelength; and (2) one or more coatings, such that either the cladding or at least one coating includes phosphor or pigments. According to some embodiments these pigments may be capable of altering the wavelength of the light such that the illumination (diffused light) provided by the outer surface of the fiber is of a different wavelength from that of the light propagating through fiber core. Preferably, the nanostructures are voids filled $SO_2$.

According to some embodiments, a light diffusing optical fiber includes: a glass core, a cladding, and a plurality of nano-sized structures situated within said core or at a core-cladding boundary. The optical fiber further includes an outer surface and is configured to (i) scatter guided light via said nano-sized structures away from the core and through the outer surface, (ii) have a scattering-induced attenuation greater than 50 dB/km at illumination wavelength; wherein the entire core includes nano-sized structures. Such fiber may optionally include at least one coating, such that either the cladding or at least one coating includes phosphor or pigments. According to some embodiments the nanostructures are voids filled $SO_2$.

According to some embodiments, a light diffusing optical fiber includes: a glass core, and a plurality of nano-sized structures situated within said core such that the entire core includes nano-structures, the optical fiber further including an outer surface and is configured to (i) scatter guided light via said nano-sized structures away from the core and through the outer surface, (ii) have a scattering-induced attenuation greater than 50 dB/km at illumination wavelength, wherein the fiber does not include cladding. According to some embodiments the nanostructures are voids filled $SO_2$. The $SO_2$ filled voids in the nano-structured area greatly contribute to scattering (improve scattering).

According to some embodiments, a light diffusing optical fiber includes: a glass core, and a plurality of nano-sized structures situated within said core such that the entire core includes nano-structures, said optical fiber further including an outer surface and is configured to (i) scatter guided light via said nano-sized structures away from the core and through the outer surface, (ii) have a scattering-induced attenuation greater than 50 dB/km at illumination wavelength wherein said fiber does not include cladding. According to some embodiments the fiber includes at least one coating such that either the cladding or the coating includes phosphor or pigments. According to some embodiments the nanostructures are voids filled $SO_2$. As stated above, the $SO_2$ filled voids in the nano-structured area greatly contribute to scattering (improve scattering).

Figure 9:
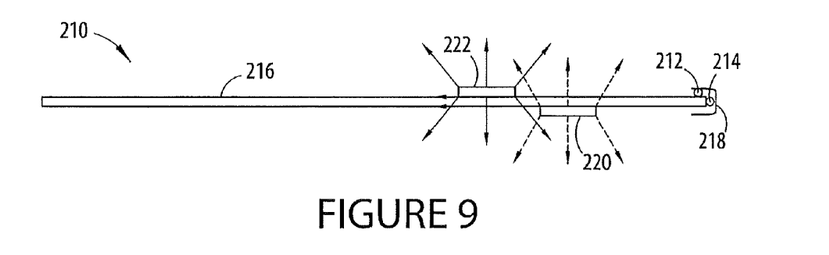
FIG. 9 is a schematic illustration of a luminophore placed on a flat glass panel, and which is excited with light coming from a light diffusing waveguide coupled to the flat panel at an edge thereof.

FIG. 9 shows an illuminated color display panel 210 that includes light diffusing waveguides 212, 214 optically coupled to a transparent panel 216. Systems and methods for coupling light into a transparent sheet or panel from a light diffusing waveguide or fiber are described in a copending patent application No. 13/094,221 filed on Apr. 26, 2011, the entire content of which is incorporated herein by reference. Coupling of light from a light diffusing waveguide to a transparent panel can be achieved by disposing the waveguide immediately adjacent an edge of the panel (e.g., in contact with an edge of the panel, and/or in contact with a major planar surface of the panel immediately adjacent an edge of the panel). In general, transparent panel 216 can be flat or curved, and can be made from various transparent glasses and/or transparent polymer materials, with examples including transparent polycarbonates and polymethyl methacrylates as well as various commercially available glasses such as Corning's Gorilla® glass. Depending on the environment of use, the dimensions of the glass panel can vary considerably, including the thickness which is typically at least 0.3 mm, and more preferably at least 0.7 mm. In general, the term "transparent" means that the panel is capable of transmitting light in the visible wavelength range, and more typically refers to panels that are capable of transmitting more light than it absorbs within the visible wavelength range.

Light is coupled into the transparent panel from the light diffusing waveguide or waveguides along at least one edge of the panel (as is the case for waveguide 214) or at a location immediately adjacent the edge (as is shown for waveguide 212). Light may be coupled into transparent panel 216 from multiple edges and/or adjacent multiple edges. A reflector 218 may optionally be employed to redirect light from waveguides 212, 214 into transparent panel 216.

Disposed on at least one, or both, of the opposing major planar (or curved) surfaces of transparent panel 216 is/are luminophores 220, 222. Any number of luminophores may be applied in any desired pattern on either or both of the major surfaces. Luminophores may be selected to be substantially transparent normally and emit a selected color when light of a given wavelength is coupled into the transparent panel 216.

Figure 10:
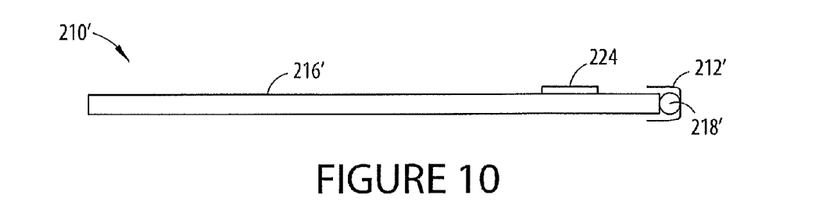
FIG. 10 shows an alternative embodiment in which a mixture of luminophores is placed on a flat panel that is illuminated at an edge by a light diffusing waveguide.

FIG. 10 illustrates a similar illuminated color display panel 210' having a single light diffusing waveguide 212' coupled to transparent panel 216'. However, rather than applying one or more luminophores in a pattern to the transparent panel 216', a mixture of different luminophores is applied in a pattern to at one surface of panel 216'. This allows multiple light sources of different wavelengths to be coupled to light diffusing waveguide 212', with each of the different light sources exciting a different luminophore in the applied mixture 224, thereby allowing a pattern with changing color depending on the color (wavelength) of the like coupled to waveguide 212'.

Figure 11:
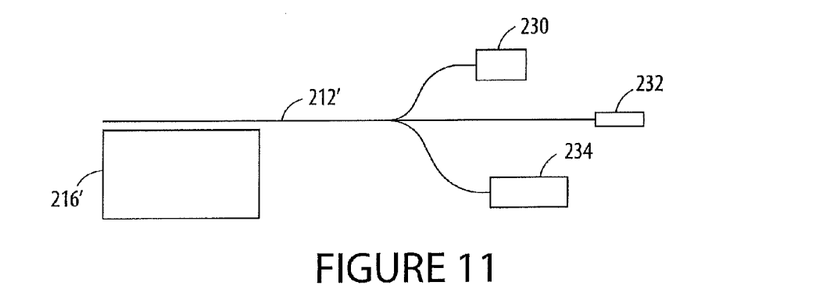
FIG. 11 is a schematic illustration in which three different light sources of different wavelength are coupled into a single light diffusing waveguide.

FIG. 11 schematically illustrates a single fiber a 212', used to illuminate panel 216' that is coupled to three different light sources 230, 232 and 234 emitting light at different wavelengths.

Figure 12:
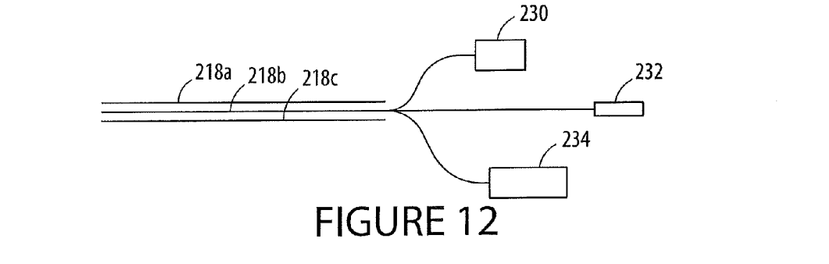
FIG. 12 schematically illustrates an alternative embodiment in which the different light sources of different wavelength are coupled to three different light diffusing waveguides in a bundle or ribbon.

FIG. 12 schematically illustrates the same concept shown in FIG. 11, except that each of the different sources 230, 232 and 234 is coupled to each of a plurality of different fibers 218a, 218b, and 218c.

The intensity of light sources 230, 232 and 234 can be changed to modulate a color in a single light diffusing fiber or bundle of light diffusing fibers or ribbon of light diffusing fibers, or in a cable version of the light diffusing fibers with transparent jacket. The cable can be used in mechanically demanding situations, such as buildings, ships, cars, etc., for protection of the fibers.

Having permanent fluorescent and/or phosphorescent markings on a transparent panel can provide important advantages by separating the luminophore and/or luminophores from the illuminating source. The light diffusing waveguides can provide illumination with near ultraviolet sources, such as a laser emitting at a wavelength of 405 nanometers. The near ultraviolet light coupled to display glass will suffer some loss, but such losses will be insignificant since the UV edge of these glasses is around 360 to 380 nanometers. The colors emitted from the luminophores upon activation by light from the light sources could be mixed to obtain different colors or different color light sources may be used in a single fiber, a bundle of fibers or ribbon of fibers. Separation of the light sources from the actual illumination point brings flexibility into the design that cannot be easily achieved using alternative technologies.

It is to be understood that the foregoing description is exemplary of certain embodiments and is intended to provide an overview for the understanding of the nature and character of the claims. The drawings are included to provide a further understanding of the claims and are incorporated and constitute part of the specification. The drawings illustrate various features in the embodiments, which, together with their description, serve to explain the principles and operation of the claimed subject matter.

It will be apparent to those skilled in the art that various modifications and variations can be made without departing from the spirit or scope of the claims.

What is claimed is:

1. An illuminated color display panel comprising:
   at least one glass core light diffusing waveguide;
   at least one light source coupled to the at least one glass core of said at least one light diffusing waveguide; and
   a transparent panel having at least one major substantially planar surface and at least one luminophore disposed in a predetermined pattern on the at least one major substantially planar surface of the transparent panel, the light being coupled from the light diffusing waveguide at or adjacent an edge of the panel to cause colored light to be emitted from the at least one luminophore situated on said substantially planar surface of the illuminated color display panel.

2. The illuminated color display panel of claim 1, in which the light diffusing waveguide includes
   (i) a glass core, comprising
      (a) a region with a plurality of nano-sized structures within said core configured to scatter guided light via said nano-sized structures towards the outer surface, such that said light diffusing optical fiber has a scattering-induced attenuation greater than 50 dB/km at illumination wavelength; and
      (b) a solid glass region surrounding said region with a plurality of nano-sized structures having a higher refractive index delta than the region with a plurality of nano-sized structures; and
   (ii) a low index cladding surrounding said core, said cladding having a lower refractive index delta than said solid glass region.

3. The illuminated color display panel of claim 2, wherein the low index cladding has a refraction index delta of less than -0.5% relative to silica.

4. The illuminated color display panel of claim 2, wherein the low index cladding is glass or a polymer.

5. The illuminated color display panel of claim 2, wherein the fiber core has a diameter greater than 50 μm and less than 500 μm, and/or a numerical aperture greater than 0.2.

6. The illuminated color display panel of claim 1, in which the light source is an ultraviolet light source or a blue light source that is absorbed by the luminophore and re-emitted from the luminophore at a different wavelength corresponding to a selected color.

7. The illuminated color display panel of claim 1, in which a plurality of patterns of different luminophores that absorb light and/or emit light at different wavelengths are provided.

8. The illuminated color display panel of claim 7, in which a plurality of different light sources emitting light at different wavelengths are coupled into the waveguide to interact with at least one luminophore.

9. The illuminated color display panel claim 8, in which the intensity of one or a plurality of the different light sources is varied independently to create desired visual effects.

10. The illuminated color display panel of claim 1, in which a plurality of light diffusing waveguides are arranged in a bundle, ribbon or cable, and wherein each of the light diffusing waveguides in the bundle, ribbon or cable is coupled to a light source.

11. The illuminated color display panel of claim 2, in which the waveguides are fibers.

12. The illuminated color display panel of claim 2, in which the nano-sized structures are voids filled with a gas.

* * * * *